United States Patent

[11] 3,584,607

| [72] | Inventor | Kenichi Yamamoto<br>Hiroshima-shi, Japan |
|---|---|---|
| [21] | Appl. No. | 829,656 |
| [22] | Filed | June 2, 1969 |
| [45] | Patented | June 15, 1971 |
| [73] | Assignee | Toyo Kogyo Co., Ltd.<br>Hiroshima-shi, Japan |
| [32] | Priority | June 6, 1968 |
| [33] | | Japan |
| [31] | | 43/47834 |

[54] COMBUSTION CHAMBER FOR A ROTARY PISTON TYPE INTERNAL COMBUSTION ENGINE
2 Claims, 2 Drawing Figs.

[52] U.S. Cl..................................................... 123/8.45,
 418/61
[51] Int. Cl....................................................... F02b 55/14
[50] Field of Search............................................ 123/8(JJ),
 8(GOK); 418/61

[56] References Cited
UNITED STATES PATENTS

| 3,297,005 | 1/1967 | Lamm | 123/8 JJ |
| 3,319,610 | 5/1967 | Hejj et al. | 123/8 JJ |

FOREIGN PATENTS

| 1,145,432 | 3/1963 | Germany | 123/8 GOK |

Primary Examiner—Allan D. Herrmann
Attorney—Sughrue, Rothwell, Mion, Zinn and Macpeak ABSTRACT: In a rotary piston internal combustion engine having a casing formed by a central housing having an epitrochoidal inner surface and side housings sealingly disposed at both sides thereof, a rotary piston with a substantially triangular profile and rotatable in a planetary motion is disposed within the casing and has a combustion chamber formed by its peripheral surface thereof as recesses starting from each apex portion and gradually increasing in depth in its rotating direction and broadest at the apex portion and gradually decreasing its width and ending intermediate the apex portions.

COMBUSTION CHAMBER FOR A ROTARY PISTON TYPE INTERNAL COMBUSTION ENGINE

BACKGROUND OF THE INVENTION

1. Field of the Invention

This invention relates to a combustion chamber of a rotary piston in a rotary piston internal combustion engine, and more particularly to an improved combustion chamber for providing complete combustion of fuel in the operating chamber by forming the combustion chamber surface of the rotary piston in a particular shape.

2. Description of the Prior Art

Conventional rotary piston internal combustion engines comprise a casing composed of a central housing with an epitrochoidal inner surface and of side housings sealingly disposed at both sides thereof. A rotary piston with a substantially triangular profile rotates in planetary motion on an eccentric shaft, and thus intakes the mixture gas through an intake hole, compresses the gas, ignites the mixture to cause explosion then exhausts the burnt gas through an exhaust hole. Rotary piston internal combustion engines of this type comprise generally a combustion chamber formed properly as a recess on the periphery of the rotary piston, and its compression ratio is changed by varying the size and depth of the recess formed thereon. This size and shape of the combustion chamber, however, not only changes the compression ratio, but greatly affects the combustion of the mixture gas to cause the capacity of the engine to be effected thereby.

In the conventional rotary piston internal combustion engines of this type, the operating chamber formed between the inner surface of the center housing and the peripheral outer surface of the rotary piston tends to be divided into two chambers, that is, a leading chamber and a trailing chamber, by the projection formed on the inner surface of the central housing. When the rotary piston is at a position at or near the top dead point of the compression stroke, this introduces a delay in the speed of flame propagation from the leading chamber to the trailing chamber, with the result that there remains unburned gas in the counter part of the trailing chamber as one disadvantage. It follows, that, after the gas is ignited, the leading chamber increases its volume with its rotary motion while the trailing chamber reduces its volume so that the gas filled within the latter chamber is compressed. This results in ejecting the gas at high speed from the trailing chamber to the leading chamber through the gap formed between the inner surface of the projection formed on the central housing and the outer peripheral surface of the rotary piston. The velocity of flame propagation in the rotating direction is accelerated while flame propagation in the counter rotating direction is decelerated to cause incomplete combustion of the gas within the trailing chamber.

SUMMARY OF THE INVENTION

This invention eliminates this and other drawbacks inherent in conventional rotary piston internal combustion engines. The present invention provides a combustion chamber of a rotary piston in a rotary piston internal combustion engine having a casing composed of a central housing with an epitrochoidal inner surface and of side housings sealingly disposed at each side thereof. A rotary piston with a substantially triangular profile is rotatable, in planetary motion, on an eccentric shaft and disposed within the casing. A combustion chamber is formed on the peripheral surface thereof as recesses starting from each apex portion than gradually increasing in depth, in its rotating direction, together with being broadest at the apex portion then gradually decreasing in width and ending intermediate the apex portions.

DESCRIPTION OF THE PREFERRED EMBODIMENT

Figure 1:
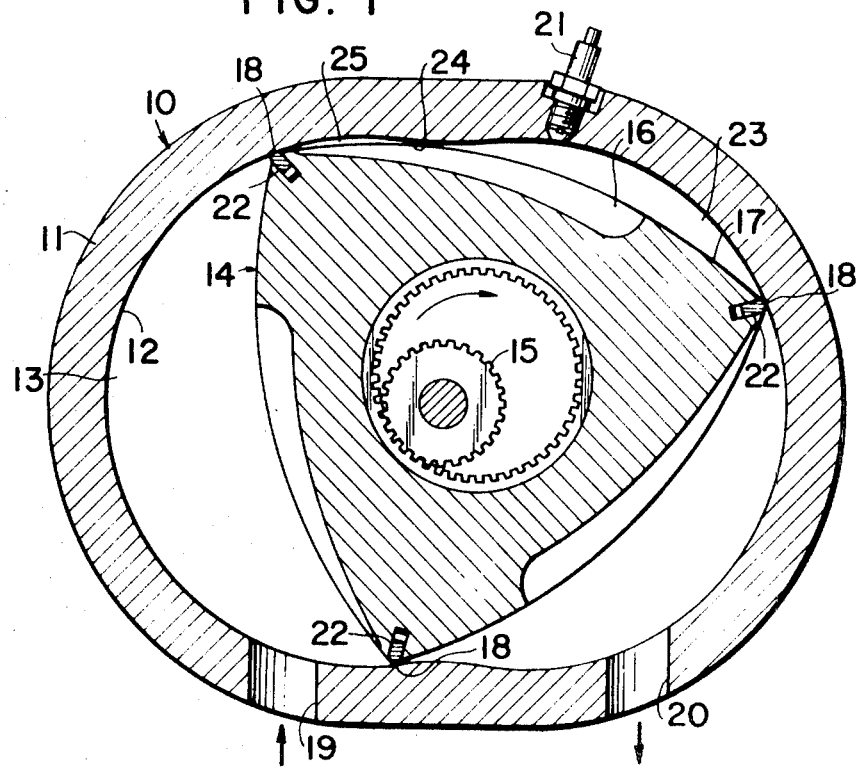
FIG. 1 is a sectional view of a rotary piston internal combustion engine having a rotary piston disposed within a casing and on an eccentric shaft and formed with combustion chamber recesses in accordance with the present invention.
Figure 2:
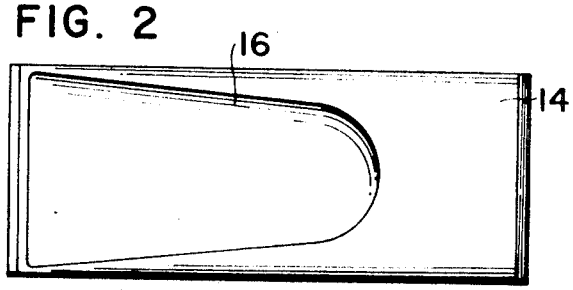
FIG. 2 is a plan view of the rotary piston forming a part of the engine of FIG. 1.

A preferred example of a combustion chamber formed on the rotary piston of a rotary piston type of internal combustion engine is shown in FIGS. 1 and 2. The engine comprises a casing 10 composed of a central housing 11 having an epitrochoidal inner surface 12 and of side housings 13 sealingly disposed at both sides thereof. Rotary piston 14 with a substantially triangular profile is supported on an eccentric shaft 15 for movement in planetary motion, within the casing 10. Piston 14 has recesses 16 formed on the peripheral surface 17 thereof, forming a combustion chamber, in such a manner that each recess 16 increases gradually in depth starting from the apex portion 18 of the rotary piston 14 in its rotating direction, together with being broadest at the apex portion 18 and then gradually decreasing in width in the rotating direction. A intake hole 19, exhaust hole 20, igniter 21, and an apex seal 22, mounted on the apex portions 18 of the rotary piston 14 are provided.

Thus, since the combustion chamber recess 16 is formed on the peripheral surface 17 of the rotary piston in such a manner that it increases gradually in depth starting from the apex portion 18 of the rotary piston 14 in its rating direction, together with being broadest at the apex portion 18 and then gradually decreasing its width in the rotating direction, the operating chamber formed between the inner surface 12 of the center housing 11 and the outer peripheral surface of the rotary piston 14 is prevented from dividing into two chambers by the presence of projection 24 of the central housing 11 as much as possible. This results in reducing the ejection speed of the gas from the trailing chamber 25 to leading chamber 23, therefore flame propagation from the leading chamber 23 to the trailing chamber 25 is easily completed.

It is understood from the foregoing description that since the trailing chamber 25 of the operating chamber is larger than conventional ones, the surface volume ratio of the chamber 25 may be small with the result that the extinguishing phenomenon of the flame within the chamber 25 may be prevented.

It is one advantage of the present invention that thus formed combustion chamber provides for complete combustion of the mixture gas within the operating chamber to cause an improvement in engine capacity.

It is also an advantage of the present invention that the exhaust of unburned gas is reduced to prevent dirt entering the atmosphere.

What I claim is:

1. In a rotary piston internal combustion engine including a casing composed of a central housing with an epitrochoidal inner surface and side housings sealingly disposed at both sides thereof, and a rotary piston with a substantially triangular profile supported on an eccentric shaft for movement in planetary motion within the casing; the improvement comprising at least one combustion chamber formed as a recess on the peripheral surface of the rotary piston, each recess increasing gradually in depth starting from the apex portion of the rotary piston and extending toward its rotating direction, and being broadest at its apex, essentially the full width of said rotary piston and gradually decreasing in width in its rotating direction.

2. A combustion chamber for a rotary piston for use in a rotary piston internal combustion engine including a casing composed of a central housing with an epitrochoidal inner surface and side housings sealingly disposed at both sides thereof, and wherein said rotary piston has a substantially triangular profile and is supported on an eccentric shaft for movement in planetary motion within the casing; said combustion chamber being formed on the peripheral surface of the rotary piston and increasing gradually in depth starting from the apex portion of the rotary piston and extending in its rotating direction and being broadest at the apex portion and gradually decreasing in width and ending intermediate the apex portions.